United States Patent [19]

Vary

[11] 4,021,395

[45] May 3, 1977

[54] AQUEOUS DISPERSION OF AN ARYLOXYSULFONE COPOLYMER

[75] Inventor: Eva M. Vary, Wynnewood, Pa.

[73] Assignee: E. I. Du Pont de Nemours and Company, Wilmington, Del.

[22] Filed: June 5, 1975

[21] Appl. No.: 584,205

Related U.S. Application Data

[63] Continuation of Ser. No. 375,051, June 29, 1973, abandoned.

[52] U.S. Cl. .......................... 260/29.2 R; 428/426; 428/457
[51] Int. Cl.² ....................................... C08G 51/24
[58] Field of Search ............. 260/29.2 R, 29.6 PM, 260/79

[56] References Cited

UNITED STATES PATENTS

| | | | |
|---|---|---|---|
| 2,721,851 | 10/1955 | Fanning | 260/29.2 R |
| 3,264,536 | 8/1966 | Robinson et al. | 260/49 |
| 3,321,449 | 5/1967 | Vogel | 260/49 |
| 3,356,629 | 12/1967 | Smith et al. | 260/29.6 PM |
| 3,445,414 | 5/1969 | Glymph et al. | 260/29.6 PM |
| 3,728,313 | 4/1973 | Hill et al. | 260/29.2 R |
| 3,775,353 | 11/1973 | Kohne et al. | 260/29.6 PM |

FOREIGN PATENTS OR APPLICATIONS

| | | | |
|---|---|---|---|
| 1,122,192 | 7/1968 | United Kingdom | 260/49 |

*Primary Examiner*—Theodore E. Pertilla

[57] ABSTRACT

The novel aqueous coating composition contains a uniformly dispersed aryloxysulfone copolymer and forms a finish that has good release properties, excellent stain resistance, good thermal stability, scratch, mar and impact resistance, and that is particularly useful as a finish for bakeware and cookware and is also useful as a finish for appliances for industrial equipment.

2 Claims, No Drawings

AQUEOUS DISPERSION OF AN ARYLOXYSULFONE COPOLYMER

CROSS-REFERENCE TO RELATED APPLICATIONS

This application is a continuation of Ser. No. 375,051, filed June 29, 1973 now abandoned.

BACKGROUND OF THE INVENTION

This invention relates to aqueous coating compositions and in particular to an aqueous dispersion of an aryloxysulfone copolymer.

Bakeware and cookware require finishes that have food release properties and thermal stability. Also, the exterior surfaces of cookware such as fry pans, covers and fry pans, the sides and bottoms of electric cooking appliances require finishes that are tough, durable and thermally stable. Industrial household ovens require thermally stable scratch-resistant finishes. The coating compositions that form these finishes should be non-airpolluting and preferably should be aqueous solutions or dispersions.

Polysulfone resins are tough, durable, scratch-resistant and thermal stable. These resins are well known in the art as shown by Vogel, U.S. Pat. No. 3,321,449, issued May 23, 1967; D'Allessandro, U.S. Pat. No. 3,355,272, issued Nov. 28, 1967; Cohen et al. U.S. Pat. No. 3,518,235, issued June 30, 1970; Pietrusza et al. U.S. Pat. No. 3,536,665, issued Oct. 27, 1970, and British Pat. No. 1,122,192, published July 31, 1968. However, it has not been possible to formulate these resins into aqueous coating compositions.

According to this invention, it is possible now to prepare coating compositions of an aqueous dispersion of aryloxysulfone copolymer that forms finishes that have excellent adhesion to all types of substrates and have excellent release properties and are tough, durable, and scratch-resistant.

SUMMARY OF THE INVENTION

The aqueous coating composition of this invention comprises a dispersion of 10–60% by weight of a film-forming binder dispersed in 37–89.9% by weight of water; wherein the dispersed binder particles have a particle size of about 0.02–0.5 microns and are dispersed by about 0.1–3.0% by weight of a surfactant and the binder comprises an aryloxysulfone copolymer of the formula

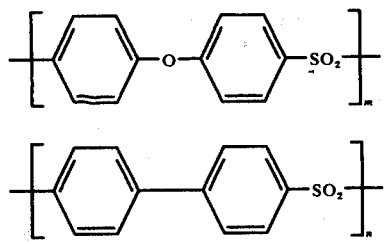

where $n$ and $m$ are positive integers from 15 to 2,500.

DESCRIPTION OF THE INVENTION

The aqueous dispersion of this invention preferably contains about 20–55% by weight of the film-forming binder. The dispersion can contain pigments which are uniformly dispersed therein in a pigment to binder weight ratio of about 1:100 to about 200:100.

The aryloxysulfone copolymer used in this invention is of the formula:

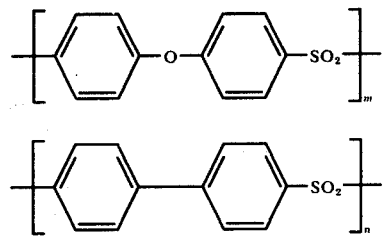

where $m$ and $n$ are positive integers from 15 to 2,500 and preferably, the ratio of $n$ to $m$ is from 4:6 to 3:7. This resin can be prepared according to the teachings of the British Pat. No. 1,122,192.

One preferred aryloxysulfone copolymer has the above formula and has an inherent viscosity of about 0.40–0.50 measured at 0.5% polymer solids in N-methyl pyrrolidone at 25° C. One particularly preferred aryloxysulfone copolymer of this type has an inherent viscosity of 0.45–0.47 measured as indicated above.

In general, the aryloxysulfone copolymer can be prepared by any of the techniques well known in the art, as shown by the aforementioned patents. The following articles also show the preparation of aryloxysulfone copolymers and are incorporated herein by reference:

Johnson et al. "Poly(Aryl Ethers) by Nucleophilic Aromatic Substitution. I. Synthesis and Properties", J. of Polymer Science, Part A-1, 5, (9) 2375–98 (1967).

Jennings et al. "Synthesis of Poly(Arylene Sulfones) and Poly(Arylene Ketones) by Reactions Involving Substitution of Aromatic Nuclei", J. of Polymer Science, Part C, No. 16 (Part 2) 715–24 (1967).

Hale et al. "Thermal Stability of Polyaryl Ethers Prepared by Aromatic Nucleophilic Substitution". Amer. Chem. Soc., Div. of Polymer Chem. Reprints 7 (2) 503–12.

About 0.1–3.0% by weight of a surfactant is added to the novel dispersion to keep the binder particles uniformly dispersed. Either anionic or nonionic surfactants can be used. Typically useful nonionic surfactants are alkyl phenoxypolyethoxyethanols having 7–12 carbon atoms in the alkyl group such as heptylphenoxypolyethoxyethanols, octylphenoxypolyethoxyethanols, methyloctylphenoxypolyethoxyethanols and the like; polyethoxyethanol derivatives of methylene linked alkyl phenols; sulfur containing agents, such as those made by condensing ethylene oxide with nonyl, dodecyl, tetradecyl mercaptans or with alkyl thiophenols having alkyl groups of six or fifteen carbon atoms; ethylene oxide derivatives of long chained carboxylic acids, such as lauric, myristic, palmitic, oleic and the like or mixtures thereof as found in tall oil; ethylene oxide condensates of long chained alcohols, such as octyl, decyl, lauryl or cetyl alcohols, ethylene oxide derivatives of etherified or esterified polyhydroxy compounds having a hydrophobic hydrocarbon chain. One preferred nonionic surfactant is isooctyl phenoxypolyethoxyethanol.

Typical anionic surfactants that can be used are sodium lauryl sulfate, sodium polynaphthalene sulfonate, soluble alkali metal and ammonium salts of half esters of sulfuric acid with long chain fatty alcohols, alkyl aryl sulfonates, alkyl aryl polyether sulfate, sulfated and sulfonated esters and ethers and alkyl sulfonates.

Other useful nonionic and anionic surfactants are listed in "Synthetic Detergents" by J. W. McCutcheon, published annually by MacNair-Dorland Company, New York, New York.

A coalescing agent can be added to the novel dispersion to form a smooth and glossy film. Preferably, phthalate esters are used in amounts of 5–50% by weight based on the weight of the polysulfone resin. Typical phthalate esters are alkyl aryl phthalates, such as butyl benzyl phthalate.

Other water dispersible resins can be blended with the novel aryloxysulfone copolymer dispersion to form high quality coating compositions, such as silicone resins, perfluorocarbon resins, such as polytetrafluoroethylene, copolymers of tetrafluoroethylene and hexafluoropropylene, polyvinyl fluoride, polyvinylidine fluoride, and the like.

One useful aqueous composition of this type comprises a blend of 75–99% by weight of the aryloxysulfone copolymer and 1–25% by weight of a silicone resin.

The silicone resin used has the formula

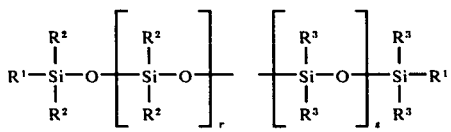

where $R^2$ and $R^3$ are monovalent radicals of hydrogen, an alkyl group having 1–8 carbon atoms, such as methyl, ethyl, propyl, isopropyl, butyl, isobutyl, pentyl, hexyl, 2-ethylhexyl or octyl or an aryl group such as phenyl, biphenyl, tolyl, xylyl, naphthyl; $R^1$ is any of the above monovalent radicals including a hydroxyl radical; $r$ and $s$ are positive integers from 0–3000 and are sufficiently large to provide a film-forming resin. Preferably, $r$ and $s$ are from about 20–400. Typical silicone resins are a blend of dimethyl polysiloxane and diphenyl polysiloxane, dimethyl polysiloxane, dimethyl diphenyl polysiloxane, hydroxy terminated dimethyl diphenyl siloxane and the like. Dimethyl diphenyl polysiloxane is a preferred resin since it forms a high quality finish with excellent release properties for cookware and bakeware.

Other preferred aqueous dispersions of this invention comprise 50–98% by weight of the aryloxysulfone copolymer and 2–50% by weight of a perfluorocarbon resin.

The perfluorocarbon resin preferably is polytetrafluoroethylene or a copolymer of tetrafluoroethylene and hexafluoropropylene. The copolymer has a tetrafluoroethylene to hexafluoropropylene weight ratio of about 95/5 to about 50/50. Preferably, the copolymer has a weight ratio of about 75/25 to about 85/15 of tetrafluoroethylene to hexafluoropropylene. Other perfluorocarbon polymer such as polyvinylidene fluoride can also be used.

The dispersed perfluorocarbon particles have a particle diameter of about 0.01 to about 6 microns. Preferably, the dispersions have particles in the range of 0.01–2.0 microns and form dispersions with excellent stability.

These aqueous dispersions of the aryloxysulfone copolymer and the perfluorocarbon resins of polytetrafluoroethylene or the copolymer of tetrafluoroethylene and hexafluoropropylene form high quality release finishes for vessels, in particular cookware and bakeware.

The novel aqueous dispersion of this invention can be pigmented in the aforementioned pigment to binder ratio. The pigments can be blended with the novel dispersion composition and then ground by conventional techniques, such as sand milling, pebble milling or ball milling to uniformly disperse the pigment in the composition. Preferably, the pigment is formed into a mill base by grinding the pigment and either a dispersion of the polysulfone resin or a dispersion of another resin if one is used or a solution of one or both of any of the above resins. The mill base is then blended with the coating composition.

The following are examples of the great variety of pigments which can be used in the coating composition of this invention: metallic oxides, preferably titanium dioxide, zinc oxide, and the like, metal hydroxides, metal flakes, such as aluminum flake, metal powders, zinc powders, sulfides, sulfate, carbonates, carbon black, silica, silicates, hydrophobic silicates, such as silicone treated with silicone dioxide, talc, china clay, iron oxide, iron blues, organic reds, maroons and other organic dyes and lakes. For high temperature use, temperature resistant pigments, such as carbon black or red iron oxide are used.

The novel dispersion of this invention can be applied to a variety of substrates, for example, metal, glass or plastics by any of the usual application methods, such as spraying, electrostatic spraying, dipping, brushing, flow coating, roller coating, reverse roller coating and the like. These coatings are baked at about 150°–425° C. for about 5 minutes to 2 hours. The resulting coating is about 0.1–10 mils thick and preferably 0.5–5 mils thick.

The novel dispersion has excellent adhesion to bare or treated metals such as aluminum or steel or to metals which have been previously primed or painted with alkyd, epoxy or acrylic enamels. Also, the dispersion can be a highly pigmented coating or can be used as a clear coating.

Finishes of the novel dispersion have particularly excellent physical properties as stated above including excellent adhesion to primed and unprimed metal substrates, toughness, hardness, crack and mar resistance. The dispersion is useful for coating vessels such as a finish for the interior or exterior of bakeware or cookware, and can be used as a coating for range parts, plumbing fixtures such as sinks, and as a clear coating for hardware items, such as saws, chisels, planes, knives and the like. Also, the novel dispersion can be utilized as a primary finish for refrigerators, stoves, washers, dryers and the like.

The novel dispersion can also be used as an adhesive for metals, glass and plastics and can be used to form laminates.

Another aspect of this invention is the process for preparing an aqueous dispersion from the aryloxysulfone copolymer which has not been possible with prior art processes. The copolymer is dissolved in a solvent for the copolymer which has a boiling point lower than water and forms an azeotrope that has a boiling point lower than water. Typical solvents are phenol N,N-dimethyl formamide, dimethyl acetamide, pyridine, N-methyl pyrrolidone, sulfone and cresol. A solution is formed having a polymer solids content of about 10–30% by weight.

The above solution is then added under high shear mixing conditions to a solution of 95–99% by weight water and 1–5% by weight of a nonionic or anionic surfactant to form an emulsion. Preferably, a shear rate of 2,000 to 10,000 reciprocal seconds is used to form the emulsion.

Residual solvent is removed from the emulsion by distillation to form a dispersion having a solids content of about 10–60% by weight and preferably 20–50% by weight.

The following Examples illustrate the invention. The parts and percentages are by weight unless otherwise specified.

EXAMPLE 1

Three solutions of an aryloxysulfone copolymer are prepared as follows by heating and thoroughly mixing the ingredients:

| Solution A | Parts by Weight |
|---|---|
| Sulfolane (tetramethylene sulfone) | 50 |
| Aryloxysulfone copolymer (having the formula $\left[\bigcirc-O-\bigcirc-SO_2\right]_n$ $\left[\bigcirc-\bigcirc-SO_2\right]_m$ where n and m are 15 to 2,500 and the copolymer has an inherent viscosity of 0.46*). | 5 |
| Nonionic surfactant (alkylaryl polyether alcohol) | 2 |
| Total | 57 |
| Solution B | |
| N-methyl pyrrolidone | 50 |
| Aryloxysulfone copolymer (described above) | 6 |
| Nonionic surfactant (described above) | 2 |
| Total | 58 |
| Solution C | |
| Dimethyl formamide | 50 |
| Aryloxysulfone copolymer (described above) | 8 |
| Nonionic surfactant (described above) | 2 |
| Total | 60 |

*Inherent viscosity is measured at 25° C. on a 0.5% polymer solids solution using N-methyl pyrrolidone as the solvent.

Each of the above solutions is slowly heated while under constant agitation until about half of the volume of solvent is removed. Then an aqueous solution containing 3% by weight of the above nonionic surfactant is prepared. An aqueous dispersion from each of three resin solutions then is prepared. The concentrated Solution A is added dropwise to 50 parts by weight of the aqueous nonionic surfactant solution using a Waring blender to agitate the surfactant solution while the Solution A is being added. A uniform stable dispersion results. Using the same procedure and constituents, Solutions B and C are formed into stable dispersions.

To each of the above prepared dispersions, 20 parts by weight of an aqueous polytetrafluoroethylene dispersion* is added and thoroughly mixed with the dispersions. Each of the compositions is then sprayed onto an aluminum panel and dried at 230° C., then baked at 400° C. to form a smooth finish having excellent release properties. Each of the above compositions is sprayed onto a separate fry pan, dried and baked as above. Each of the fry pans have finishes with excellent release properties even after extended cycles of use, i.e. heating to 200° C., and then cooling.

* Polytetrafluoroethylene dispersion — 60% Polymer solids in water having a particle size of 0.19–0.27 microns dispersed at 6% by weight of an alkyl aryl polyether alcohol.

Compositions A, B and C without the addition of the polytetrafluoroethylene dispersion are applied to separate aluminum substrates and dried and baked as above, and gave finishes with excellent release properties and good appearances.

Fry pans are coated as above with each of the compositions and dried and baked as above. The finishes on each of the fry pans retained the release properties after 52 of the above cooking cycles of heating and cooling.

EXAMPLE 2

An aqueous dispersion of the aryloxysulfone copolymer is prepared as follows:

| Portion 1 | Parts by Weight |
|---|---|
| m-cresol | 200 |
| Aryloxysulfone copolymer (described in Example 1) | 10 |
| Nonionic surfactant (described in Example 1) | 2 |
| Portion 2 | |
| Toluene | 5 |
| Portion 3 | |
| Methylene chloride | 250 |
| Portion 4 | |
| Deionized water | 300 |
| Nonionic surfactant (described above) | 3 |
| Anionic surfactant solution (30% aqueous solution of the sodium salt of lauryl alcohol) | 5 |
| Acetone | 100 |
| Total | 875 |

Portion 1 is charged into a mixing vessel and agitated until the copolymer is dissolved. Portion 2 is then added and blended into the mixture. Then Portion 3 is added and blended into the mixture. Portion 4 is premixed and charged into a Waring blender and agitated. The above mixture of Portions 1–3 is slowly added to Portion 4 while under constant agitation to form an aqueous dispersion. The dispersion is charged into a steam distillation apparatus and distilled for about 4–5 hours until the solvents are removed.

The resulting dispersion is sprayed onto an aluminum substrate and dried and baked as in Example 1. The resulting finish has excellent adhesion to the metal substrate, is smooth and glossy and has excellent food release properties, even after several heating and cooling cycles.

An aqueous polytetrafluoroethylene dispersion described in Example 1 is blended with the above dispersion to form a dispersion with a weight ratio of aryloxysulfone copolymer to polytetrafluoroethylene of 50:50. This dispersion is sprayed onto an aluminum fry pan and dried and baked as in Example 1. The resulting finish is smooth and even, and has excellent adhesion to the metal substrate and has good food release properties after several cooking cycles.

EXAMPLE 3

An aqueous dispersion of the aryloxysulfone resin is prepared as follows:

| Portion 1 | Parts by Weight |
|---|---|
| Aryloxysulfone copolymer (described in Example 1) | 30.0 |
| Pyridine | 1500.0 |
| Portion 2 | |
| Deionized water | 2500.0 |
| Nonionic surfactant (described in Example 1) | 1.8 |
| Total | 4031.8 |

Portion 1 is charged into a mixing vessel and the copolymer is dissolved in the solvent. Portion 2 is charged into a Waring blender and mixed for about 1-2 minutes. Portion 1 is slowly added to Portion 2 under constant agitation to form a dispersion. The dispersion is then distilled to remove the solvent and a dispersion having a 25-30% polymer solids content is formed. The dispersion is sprayed onto an aluminum panel and onto an aluminum frying pan, dried and baked as in Example 1. The resulting finish is smooth, has good adhesion to the substrate, and has excellent release properties, even after several cooking cycles.

An aqueous dispersion of the aryloxysulfone copolymer is prepared as above except before the solvent is removed by distillation the following solution was added — 40 parts by weight of a 35% solids emulsion of dimethyl polysiloxane dissolved in 6000 parts of toluene. The solvent was then removed by distillation to form a dispersion having a solids content of about 25-30%. The dispersion is applied as above to an aluminum substrate and frying pan, dried and baked. The resulting finish is smooth and has good adhesion and good release properties, even after several cooking cycles.

The invention claimed is:

1. An aqueous dispersion containing 10-60% by weight of a film-forming binder dispersed in 37-89.9% by weight of water, wherein the dispersed binder particles have a particle size of about 0.02-0.5 microns and are dispersed by an 0.1-3% by weight of a nonionic surfactant or an anionic surfactant; and the binder comprises an aryloxysulfone copolymer of the formula

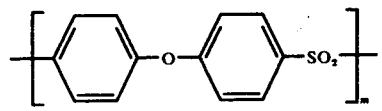

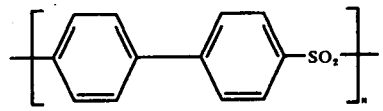

where $n$ and $m$ are positive integers from 15 to 2,500.

2. The aqueous dispersion of claim 1 having pigment uniformly dispersed therein in a pigment to binder ratio of about 1:100 to about 200:100 and wherein the ratio of the integers $n$ and $m$ is from 4:6 to 3:7.

* * * * *